US009031922B2

(12) United States Patent
Andrew et al.

(10) Patent No.: US 9,031,922 B2
(45) Date of Patent: May 12, 2015

(54) CODE REGENERATION DETERMINATION FROM SELECTED METADATA FINGERPRINTS

(75) Inventors: Felix Gerard Torquil Ifor Andrew, Seattle, WA (US); Sridhar S. Madhugiri, Sammamish, WA (US); Daniel James Moseley, Redmond, WA (US); Brian Faris Chapman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 235 days.

(21) Appl. No.: 13/461,995

(22) Filed: May 2, 2012

(65) Prior Publication Data

US 2013/0297579 A1    Nov. 7, 2013

(51) Int. Cl.
*G06F 17/30* (2006.01)
*G06F 9/44* (2006.01)

(52) U.S. Cl.
CPC ........................................ *G06F 8/71* (2013.01)

(58) Field of Classification Search
USPC .................. 707/697, 698, E17.105; 717/145
See application file for complete search history.

(56) References Cited

U.S. PATENT DOCUMENTS

| 5,978,585 | A  | * | 11/1999 | Crelier ........................... 717/145 |
| 6,973,646 | B1 | * | 12/2005 | Bordawekar et al. ......... 717/146 |
| 7,725,884 | B2 |   | 5/2010  | Ramani et al. |
| 7,823,060 | B2 |   | 10/2010 | Mohamed |
| 8,095,565 | B2 |   | 1/2012  | Dengler et al. |
| 2009/0064196 | A1 | | 3/2009 | Richardson et al. |

(Continued)

FOREIGN PATENT DOCUMENTS

CA    2019603    A1 *    12/1990

OTHER PUBLICATIONS

Johnson, J. Howard. "Identifying redundancy in source code using fingerprints." Proceedings of the 1993 conference of the Centre for Advanced Studies on Collaborative research: software engineering-vol. 1. IBM Press, 1993.*

(Continued)

*Primary Examiner* — Usmaan Saeed
*Assistant Examiner* — Nan Hutton
(74) *Attorney, Agent, or Firm* — Kevin Sullivan; Kate Drakos; Micky Minhas

(57) ABSTRACT

A fingerprint is computed from selected metadata of binary files, and used in determining whether to regenerate code-behind file(s). In one case, after ascertaining that a binary-file-set's current metadata-fingerprint differs from a previous metadata-fingerprint, the corresponding code-behind-file-set is regenerated. A code-behind file may also be regenerated, even though its current fingerprint matches its previous fingerprint, because its metadata has changed. If the current fingerprint matches the previous fingerprint and metadata is unchanged, regeneration can be avoided. The fingerprint may consist of, or merely contain, definitions of classes, properties, and other items, and may be limited to metadata that is used when generating the code-behind-file-set. System assemblies are not fingerprinted. Timestamps may be used. Metadata-fingerprint computation code and regeneration determination code are described. Metadata-fingerprints may be used in developing applications with web-based application code frameworks, frameworks having code for rendering a user interface, other frameworks, XAML, C#, and other programming languages.

20 Claims, 3 Drawing Sheets

(56) References Cited

U.S. PATENT DOCUMENTS

2010/0293533 A1* 11/2010 Andrade et al. ............. 717/140
2011/0320473 A1* 12/2011 Desmond et al. ............. 707/769

OTHER PUBLICATIONS

Philip, K., P. Eric, and H. C. Betty. "Composing adaptive software." (2004).*

"Merging WPF assemblies", Retrieved at <<http://selfdocumentingcode.blogspot.in/2010/02/merging-wpf-assemblies.html>> Feb 2, 2010, pp. 5.

Strahl, Rick, "Web application project generated code behind .designer file not being updated", Retrieved at <<http://www.west-wind.com/weblog/posts/2009/Apr/07/Web-Application-Project-generated-CodeBehind-designer-file-not-being-updated>> Apr. 7, 2009, pp. 12.

"Multilanguage using resource files (resx) in C# .NET", Retrieved at <<http://thuriot.be/multilanguage-using-resource-files-resx-in-c-net/>> May 15, 2011, pp. 3.

"Assemblies", Retrieved at <<http://msdn.microsoft.com/en-us/library/hk5f4Oct(v=vs.71).aspx>>, no later than Apr. 5, 2012, pp. 1.

"Code-Behind and XAML in WPF", Retrieved at <<http://msdn.microsoft.com/en-us/library/aa970568.aspx>>, no later than Apr. 4, 2012, pp. 3.

"Extensible Application Markup Language", Retrieved at <<http://en.wikipedia.org/wiki/Extensible_Application_Markup_Language, Feb. 26, 2012, pp. 4.

"Metadata Tokens", Retrieved at <<http://msdn.microsoft.com/en-us/library/ms404456.aspx>>, no later than Apr. 5, 2012, pp. 5.

" Self Documenting Code: Merging WPF assemblies", Retrieved at <<http://selfdocumentingcode.blogspot.com/2010/02/merging-wpf-assemblies.html>>, Feb. 2, 2010, pp. 5.

"System.Reflection.Assembly Class", Retrieved at http://www.gnu.org/software/dotgnu/pnetlib-doc/System/Reflection/Assembly.html>>, no later than Apr. 5, 2012, pp. 6.

"The Code-Behind Model", Retrieved at <<http://www.aspnetbook.com/tips/new_features_code_behind_model.php>>, copyright date 2010-2011, pp. 2.

Strahl, Rick, "Web application project generated code behind .designer file not being updated", Retrieved Apr. 4, 2012 at <<http://www.west-wind.com/weblog/posts/2009/Apr/07/Web-Application-Project-generated-CodeBehind-designer-file-not-being-updated>> Apr. 7, 2009, pp. 5.

* cited by examiner

CODE REGENERATION DETERMINATION FROM SELECTED METADATA FINGERPRINTS

BACKGROUND

Although much computer program source code is authored directly by developers, source code can also be automatically generated by a software tool. Examples of tools which generate source code may be found, for instance, among template processors, integrated development environments, graphical user interface design wizards, web design programs, and authoring systems. Thus, the source code for a given application may include both developer-authored source code and automatically generated source code.

In general, changing source code will be followed at some point by recompiling the changed source code, in order to propagate the change into the application's runtime behavior. The change in source code can be automatically inferred, for example, from a change in the timestamp on a source code file.

SUMMARY

In a code-behind model, source code (and sometimes other code) is automatically generated to simplify authoring an application. For instance, an application program may include a UI (user interface) file that defines UI appearance, and one or more generated code-behind files that support the UI. Code-behind files are typically source files, which are compiled into binary files. However, code-behind files may also be non-compilable. The developer-authored source in the UI file or elsewhere uses metadata that defines classes, value types, fields, methods, interfaces, and other declarations. The metadata is stored in the corresponding binary files, in tables and/or other data structures. In some embodiments described herein, a fingerprint is derived from selected metadata. The fingerprint is focused, not merely on the metadata within the binary file, but even further in some embodiments, on a portion of that metadata.

Some changes to an application's developer-authored source code will not be propagated into the application's runtime behavior unless appropriate generated code (e.g., automatically-authored, tool-authored) code is regenerated. A brute force approach would regenerate all automatically-authored code anytime the source code is changed, but this approach may spend resources on unnecessary regeneration.

Some embodiments described herein determine whether to regenerate code by testing for changes in selected metadata, and sometimes by using additional tests. In many embodiments, changes can still be inferred using file timestamps. But the inspection for selected metadata changes described herein provides a finer-grained control of code regeneration than file timestamps alone.

Some embodiments regenerate a code-behind file because its binary file's current fingerprint differs from its previous fingerprint. One embodiment computes a current metadata-fingerprint of a binary-file-set; a file-set is simply a set of one or more files. The binary-file-set is derived (e.g., by compilation or interpretation) from a code-behind-file-set of an application. The binary-file-set has a metadata-portion and a non-metadata-portion. The metadata-portion includes the metadata on which the metadata-fingerprint is based, and the non-metadata-portion includes the rest of the binary file-set (including metadata, if any, that is not used as a basis for the fingerprint). That is, the current metadata-fingerprint computation is based at least in part on the metadata-portion, and is independent of at least part of the non-metadata-portion. In response to ascertaining that the current metadata-fingerprint differs from a previous metadata-fingerprint of the binary-file-set, this embodiment regenerates the code-behind-file-set.

Some embodiments regenerate a code-behind file, even though its current fingerprint matches its previous fingerprint, because its actual metadata has changed. This addresses the case where two different metadata contents happen to yield the same fingerprint. After ascertaining that the current metadata-fingerprint matches a previous metadata-fingerprint of the binary-file-set, one embodiment finds that the current metadata-portion differs from a copy of the metadata-portion which was made when the previous metadata-fingerprint of the code-behind-file-set was computed. In response, the embodiment regenerates the code-behind-file-set.

Some embodiments avoid regenerating a code-behind file, because its current fingerprint matches its previous fingerprint, and its actual metadata has not changed. One embodiment ascertains that the current metadata-fingerprint matches a previous metadata-fingerprint of the binary-file-set, and also finds that the current metadata-portion matches a copy of the metadata-portion which was made when the previous metadata-fingerprint of the binary-file-set was computed. In response, the embodiment avoids regenerating the code-behind-file-set.

An embodiment may compute a metadata-fingerprint in various ways. For instance, the fingerprint may consist of, or may contain, a hash, a checksum, and/or digital signature based on the digital content of the metadata-portion. Fingerprints may be based, e.g., on TypeDef, FieldDef, and MethodDef metadata tables. In some embodiments, computing the current metadata-fingerprint involves reading metadata which includes at least one type definition, at least one method definition, and at least one field definition, and these definitions are permitted to overlap one another. A metadata-fingerprint may also be defined recursively in an embodiment, e.g., as a collection of constituent fingerprints. For example, a metadata-fingerprint could be defined to include a TypeDef table hash and a checksum of all public method definitions.

In some embodiments, the metadata-fingerprint computation for at least one binary-file-set is based on class(es) and/or on property(ies) that are used when generating the code-behind-file-set corresponding to that binary-file-set, and is not based on any class/property that is not used when generating that code-behind-file-set. In some, the computation is based at least in part on public method(s) of the code-behind-file-set corresponding to that binary-file-set, and is not based on at least one private method of that code-behind-file-set.

The metadata-portion is characterized in some embodiments as including, or variously as consisting of, type definition(s), method definition(s), field definition(s), class property definition(s) that are used when generating a code-behind-file-set that corresponds to the binary-file-set, class definition(s) that are used when generating a code-behind-file-set that corresponds to the binary-file-set, or public method definition(s) that are used when generating a code-behind-file-set that corresponds to the binary-file-set.

Some embodiments test multiple fingerprints for a given application. Some compute respective current metadata-fingerprints for multiple binary-file-sets of the application, and ascertain whether each current metadata-fingerprint differs from a previous metadata-fingerprint for its respective binary-file-set.

Some embodiments don't bother fingerprinting system assemblies or other binary-file-sets that a developer is unlikely (or even unable) to change. One embodiment identifies a binary-file-set as a system binary-file-set, and then avoids computing a current metadata-fingerprint for that system binary-file-set.

Some embodiments determine whether to regenerate source and/or other code-behind file(s) based on fingerprint(s) of selected metadata as a result of the developer starting a software application build, as an attempt to build an application in a computing environment. The computing environment has random access memory in communication with at least one processor. The embodiment proactively computes respective metadata-fingerprints for dependent binary-file-sets of the application. Each dependent binary-file-set is derived from a code-behind-file-set of the application or passed in (e.g., hard-coded). Each binary-file-set has a respective metadata-portion and a respective distinct non-metadata-portion. Each metadata-fingerprint computation is based at least in part on the respective metadata-portion and is independent of at least part of the respective non-metadata-portion. The embodiment computationally and proactively determines whether to regenerate a code-behind-file-set based at least in part on whether the metadata-fingerprint for the binary-file-set derived from that code-behind-file-set has changed since a previous attempt to build the application.

Some embodiments check whether a timestamp of a code-behind-file-set matches a timestamp of a user-interface-file-set of the application. Some generate a code-behind-file-set and set a timestamp of that code-behind-file-set to match a timestamp of a user-interface-file-set of the application.

Some embodiments include metadata-fingerprint computation code residing in a memory which, upon execution by a processor, computes a metadata-fingerprint that is computationally based at least in part on the metadata-portion, and is computationally independent of the non-metadata-portion.

Some embodiments include regeneration determination code residing in a memory which, upon execution by a processor, computationally determines whether to regenerate a code-behind-file-set based at least in part on whether the metadata-fingerprint for the binary-file-set derived from that code-behind-file-set has changed since a previous application build attempt.

Some embodiments include regeneration determination code which computationally determines whether to regenerate a code-behind-file-set as follows: if a UI file-set corresponding to the code-behind-file-set has changed then regenerate the code-behind-file-set, and otherwise, compute the metadata-fingerprint of the binary-file-set, compare it to a previously generated metadata-fingerprint of the binary-file-set, and if the metadata-fingerprint has changed, then regenerate the binary-file-set, and otherwise compare the meta-data-portion to a copy of the metadata-portion made last time the binary-file-set was metadata-fingerprinted, and if the metadata-portion has changed, then regenerate the binary-file-set.

Embodiments may be used in developing any of a wide variety of applications. For example, some applications include Visual Basic® code (mark of Microsoft Corporation), other BASIC code, XAML code, C++ code, C# code, JavaScript® code (mark of Oracle America, Inc.) and/or HTML or other markup language code. Some embodiments are suitable for use in a variety of frameworks, such as the Silverlight® framework (mark of Microsoft Corporation), Windows Presentation Foundation framework, WinForms framework, web-based application code frameworks, and/or frameworks having code for rendering a user interface. Other frameworks and/or other programming languages may also be used in conjunction with an embodiment.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
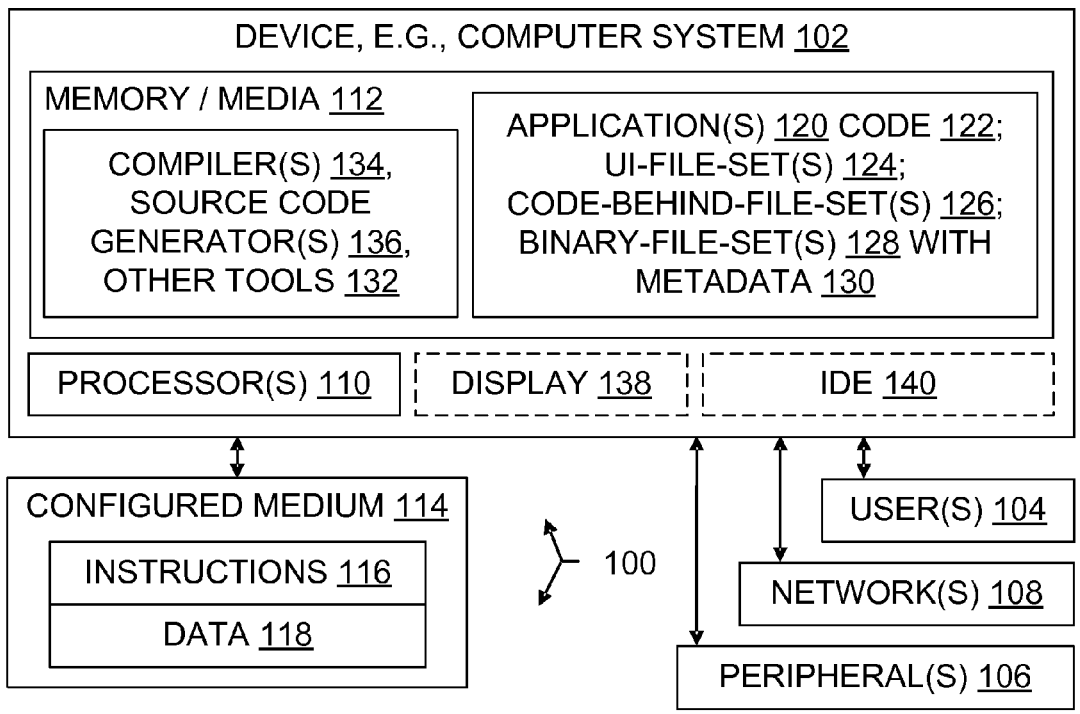
FIG. 1 is a block diagram illustrating a computer system having at least one processor, at least one memory, components to assist in building at least one application using generated code, and other items in an operating environment which may be present on multiple network nodes, and also illustrating configured storage medium embodiments.

Some declarative UI markups use tool-generated code to 'wire them up' to the runtime. This code is generated by a build system, and is built and included in the final application. Some examples are applications that use XAML, Windows Presentation Foundation, Silverlight® components, or Microsoft® Windows® 8 components (marks of Microsoft Corporation). The declarative UI, and therefore the generated code, uses types which are present in the frameworks, and also in the application being developed. However they often do not use all the types in the framework, nor all the types in the application. When the types in the framework or application change, the code-behind files are to be updated if these types were referenced or otherwise used in the code-behind files.

Optimizations have been made to speed up the generation of code-behind files, such as caching type lookups, and using timestamps to skip generating first pass files. Many embodiments described here are compatible with those optimizations, because the embodiments address the threshold question of whether the code behind needs to be re-generated or not.

In a brute force approach used by a XAML compiler, the compiler walks through every xaml file, generates the code-behind file in volatile memory, checks the previous version of the file, and if there are differences between the current and previous version writes the new file to non-volatile memory. By contrast, some embodiments described here use a fingerprint of metadata of the framework and application assemblies to determine whether to regenerate the code-behind. This can provide substantial performance improvement in software development.

Some embodiments described herein may be viewed in a broader context. For instance, concepts such as source code generation, type definitions, dependency, fingerprints, and timestamps may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving code generation, type definitions, dependency, fingerprints, or timestamps are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Those of skill will understand which meaning is intended in a particular instance, and will also understand that a given claimed process (in the patent law sense) may be implemented using one or more processes (in the computing science sense).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise beyond the scope of human performance alone.

"Computational steps" are steps performed computationally. Neither "automatically" nor "computationally" necessarily means "immediately".

"Proactively" means without a direct request from a developer or other user of an embodiment. Indeed, a user may not even realize that a proactive step by an embodiment was possible until a result of the step has been presented to the user. Except as otherwise stated, any computational and/or automatic step described herein may also be done proactively.

A "file-set" is a set of one or more files.

In the "code-behind model" an application program includes a UI (user interface) file and one or more code-behind files. The UI file defines the appearance of a user interface, and each code-behind file includes code that supports the UI, such as code that marshalls or manages resources, or code which executes in response to an event initiated through the UI, for example. More generally, the code-behind model herein covers any kind of program development where source code is automatically generated to simplify authoring an application.

In an application program, "metadata" includes declarative information about runtime types, e.g., classes, value types, and interfaces. Metadata may also include information about global functions and global variables. The metadata can be stored in tables. In some environments, for example, a TypeDef table contains type declarations such as a reference to a runtime reference type or a value type; a FieldDef table contains field declarations such as a declaration of a variable as a data member of a class or interface, or a declaration of a global, module-level variable; and a MethodDef table contains method definitions such as a definition of a method as a member of a class or interface, or as a global module-level method. These three tables are only examples; many other kinds of metadata tables and other metadata storage structures can also be used.

A "binary file" is a unit of deployment that may contain metadata, e.g, a binary representation of types. A binary file may include types and resources that form a logical unit of functionality, and metadata (sometimes called a "manifest") that describes how the types and resources relate and what they depend on to work properly. When an application program runs, the binary files it invokes must be present, and other binary files need not be present. A Microsoft® assembly is an example of a binary file (mark of Microsoft Corp.). Some other examples include .il, .dll, .exe, .winmd, and .obj files. Binary files contain metadata in metadata tables and/or other data structures.

"Code-behind" files are typically source files, which are compiled into binary files. The relationship between UI and/or other file(s), on the one hand, and the code-behind file(s) generated from those UI and/or other file(s), on the other hand, may be one-to-one, one-to-many, or many-to-one. That is, one UI file may have one or more corresponding code-behind files, and a given code-behind file may be generated to support one or more UI files, depending on the embodiment and the particular application's architecture. Code-behind files may also be non-compilable. As one of many possible examples, if a XAML file contains a vector, an application build may convert the vector into a .png or other format graphics file and directly embed that resulting image in the executable application as a resource, rather than using compilation to embed the image.

A "fingerprint" is a value derived from a larger set of values, which tends to change when a change is made in the larger set of values. Depending on how the fingerprint is derived, and on the specific set of values the fingerprint is derived from, it may sometimes happen that a change in the set of values yields no change in the fingerprint, but this is relatively rare, e.g., one may define a derivation technique as a fingerprinting technique if 95% (or another specified threshold) of changes to the set of values will produce a change in the fingerprint derived from the set of values. One may also define a derivation technique as a fingerprinting technique according to the general category of techniques used to derive the fingerprint, e.g., fingerprints may be defined as hashes, checksums, and/or digital signatures.

Throughout this document, use of the optional plural "(s)", "(es)", or "(ies)" means that one or more of the indicated feature is present. For example, "file(s)" means "one or more files" or equivalently "at least one file".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as ascertaining, attempting, avoiding, basing, building, checking, comparing, compiling, computing, configuring, deriving, determining, executing, finding, generating, having, identifying, interpreting, reading, regenerating, residing, setting, starting, using (ascertains, ascertained, attempts, attempted, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a transitory signal on a wire, for example. Unless expressly stated otherwise in a claim, a claim does not cover a signal per se. A memory or other computer-readable medium is presumed to be non-transitory unless expressly stated otherwise.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, rgb camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable non-transitory storage media 112. Media 112 may be of different physical types. The media 112 may be volatile memory, non-volatile memory, fixed in place media, removable media, magnetic media, optical media, and/or of other types of non-transitory media (as opposed to transitory media such as a wire that merely propagates a signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other memory storage devices which are not readily removable by users 104. Unless expressly stated otherwise, neither a computer-readable medium nor a computer-readable memory includes a signal per se.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic. Alternatively, or in addition to software implementation, the functionally described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components.

In the illustrated environments 100, one or more applications 120 have code 122 such as user interface declaration/description code files (e.g., ui-file-sets 124), user interface support code files (e.g., code-behind-file-sets 126), and executable and/or interpretable code files (e.g., binary-file-sets 128 that include metadata 130). Software development tools 132 such as compilers 134 and source code generators 136 assist with software development by producing and/or transforming code 122. The code 122, tools 132, and other items shown in the Figures and/or discussed in the text, may each reside partially or entirely within one or more hardware media 112, thereby configuring those media. In addition to processors 110, memory/storage media 112, and display(s) 138, an operating environment may also include other hardware, such as buses, power supplies, wired and wireless network interface cards, and accelerators, for instance.

A given operating environment 100 may include an Integrated Development Environment (IDE) 140 which provides a developer with a set of coordinated software development tools 132 such as compilers, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with endeavors outside the field of software development per se.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
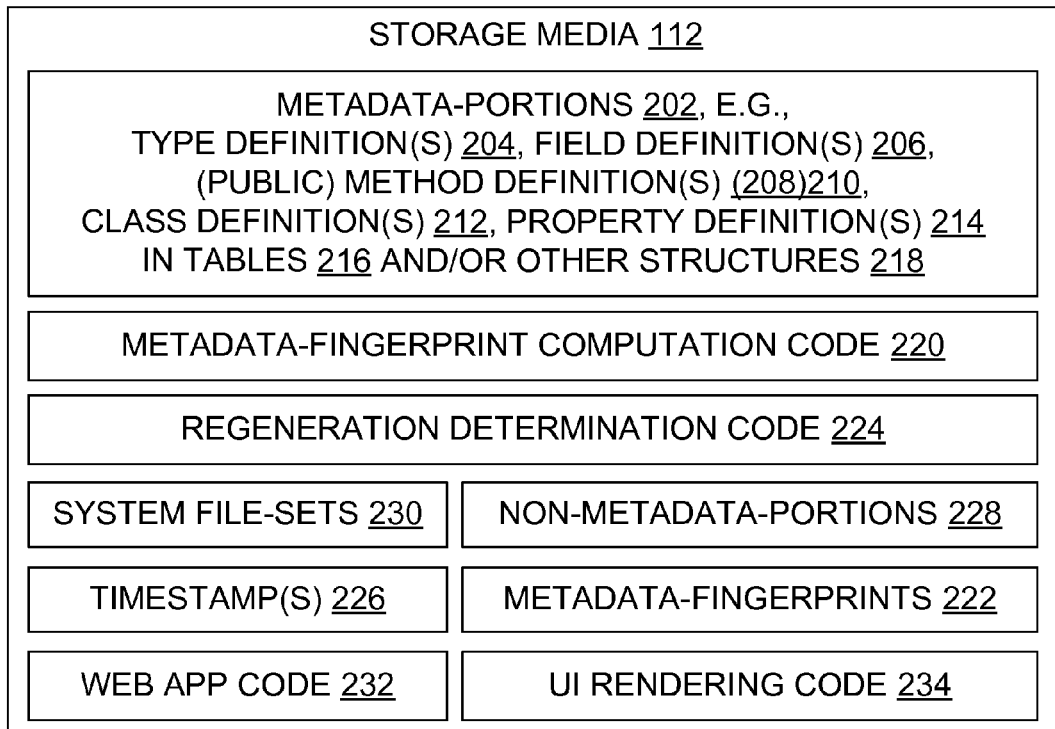
FIG. 2 is a block diagram illustrating aspects of code regeneration determination from selected metadata fingerprints, in an example architecture.

FIG. 2 illustrates an architecture which is suitable for use with some embodiments. Metadata-portions 202 of binary-file-sets 128 are subsets of the binary-file-sets' metadata 130; they are proper subsets in some embodiments. For example, metadata-portions 202 may include or consist of type definition(s) 204, field definition(s) 206, public method definition(s) 208, public and/or private method definition(s)

210, class definition(s) 212, class property definition(s) 214, and/or other metadata. Metadata is stored in tables 216 and/or other data structures (trees, lists, blobs, objects, etc.) 218 in binary-files-sets 128.

Metadata-fingerprint computation code 220 computes metadata-fingerprints 222 based on metadata-portions 202. Non-metadata-portions 228 are binary-file-set 128 portions that either have no metadata on which metadata-fingerprints 222 are based, or have no metadata 130 at all. Metadata-fingerprints 222 are not based on non-metadata-portions 228. In some embodiments, some or all of the system file-sets 230 (e.g., system assemblies) are not metadata-fingerprinted.

Regeneration determination code 224 uses the metadata-fingerprints 222 to determine whether code-behind-file-sets 126 corresponding to the metadata-fingerprinted binary-file-sets 128 should be regenerated in the course of trying to build the application 120 that uses those codes 126, 128. File timestamp(s) 226 may also be used by a given code 224 in making the regeneration determination(s).

The codes 220, 224 are not inherently limited to particular kinds of applications 120 or particular kinds of application frameworks, aside from the stated characteristics such as source code generation. Accordingly, an embodiment may be used in development of web application code 232, in development projects that include user interface rendering code 234, and with code 122 written in XAML, C++, C#, and many other programming languages.

With reference to FIGS. 1 and 2, some embodiments provide a computer system 102 with a logical processor 110 and a memory medium 112 configured by circuitry, firmware, and/or software to transform metadata 130 by creation and use of metadata-fingerprints 222 as described herein.

In some embodiments, a computer system includes a logical processor 110, a memory 112 in operable communication with the logical processor, and a binary-file-set 128 residing in the memory. The binary-file-set 128 has a metadata-portion 202 and a non-metadata-portion 228. Metadata-fingerprint computation code 220 also resides in the memory. Upon execution by the processor(s) 110, code 220 computes a metadata-fingerprint 222 that is computationally based at least in part on the metadata-portion, and is computationally independent of the non-metadata-portion. The metadata-fingerprint 222 includes at least one of the following structures: a hash, a checksum, a digital signature.

In some embodiments, the metadata-portion 202 is characterized in at least one of the following ways: it includes and/or consists of type definition(s); includes and/or consists of method definition(s); includes and/or consists of field definition(s); includes and/or consists of class property(ies) definition(s) that are used when generating a code-behind-file-set that corresponds to the binary-file-set; includes and/or consists of class(es) definition(s) that are used when generating a code-behind-file-set that corresponds to the binary-file-set; includes and/or consists of public method definition(s) that are used when generating a code-behind-file-set that corresponds to the binary-file-set.

Some embodiments include at least one of the following codes residing in the memory 112: XAML code 122, C++ code 122, C# code 122, BASIC code 122, markup language code 122, web-based application code 232, 122, code 234, 122 for rendering a user interface.

Some embodiments include regeneration determination code 224 residing in the memory 112. Upon execution by the processor(s) 110, some embodiments of the code 224 computationally determine whether to regenerate a code-behind-file-set 126 based at least in part on whether the metadata-fingerprint 222 for the binary-file-set 128 derived from that code-behind-file-set has changed since a previous application 120 build attempt. In some embodiments, a binary-file-set is not necessarily derived from a code-behind-file-set but is instead hard-coded as part of the build, or passed in as a parameter of the build. In some embodiments, code 224 computationally determines whether to regenerate a code-behind-file-set 126 as follows: if a UI file-set 124 corresponding to the code-behind-file-set has changed then regenerate the code-behind-file-set. Otherwise, compute the metadata-fingerprint 222 of the binary-file-set 128, compare it to a previously generated metadata-fingerprint of the binary-file-set, and if the metadata-fingerprint has changed, then regenerate the binary-file-set. Otherwise compare the metadata-portion 202 to a copy of the metadata-portion made last time the binary-file-set was metadata-fingerprinted, and if the metadata-portion has changed, then regenerate the binary-file-set.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, UI-file-sets 124 may be on multiple devices/systems 102 in a networked cloud, codes 220, 224 may run on yet other devices within the cloud, and the application 120 may configure the display on yet other cloud device(s)/system(s) 102.

Processes

Figure 3:
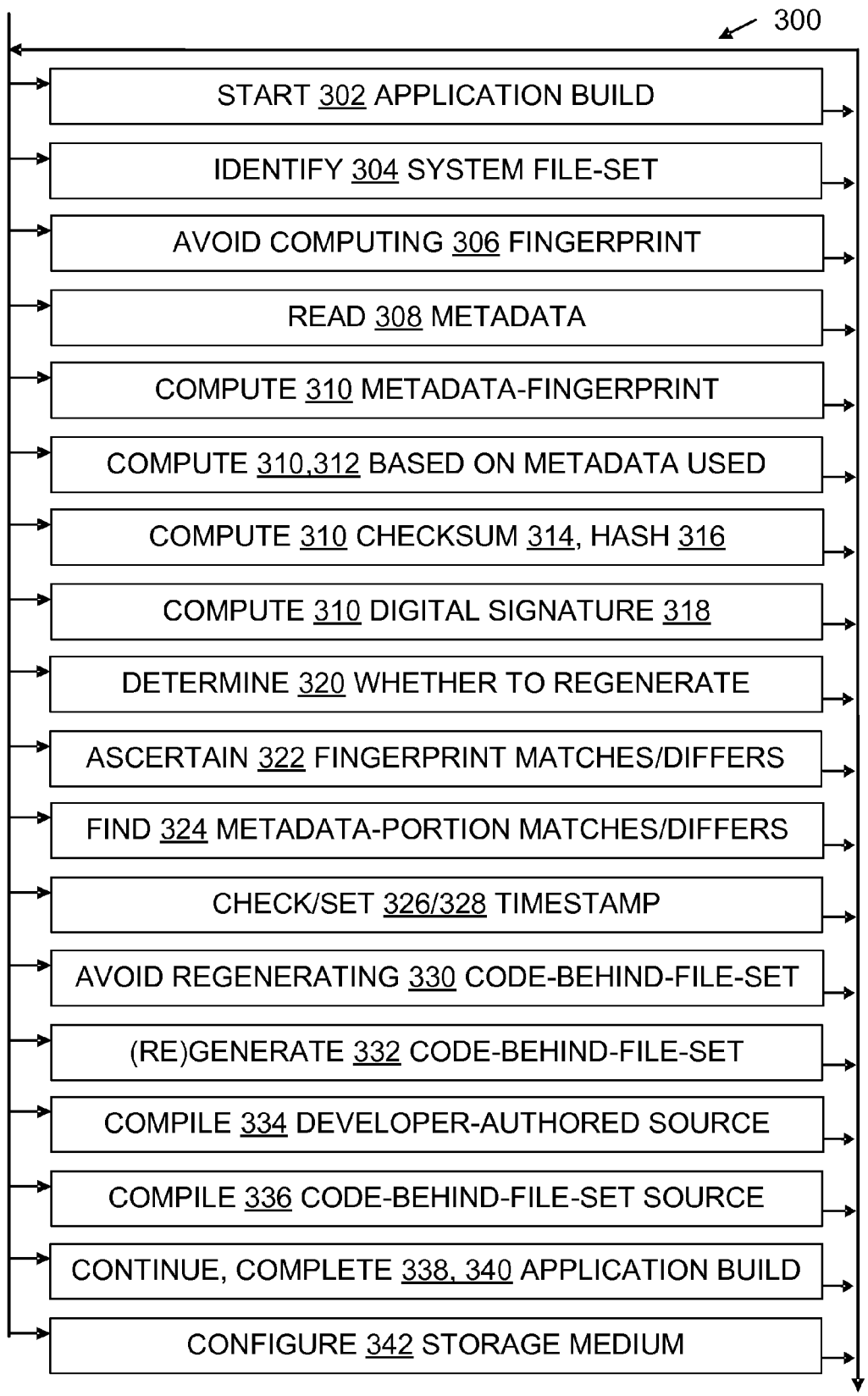
FIG. 3 is a flow chart illustrating generally the steps of various process and configured storage medium embodiments.
Figure 4:
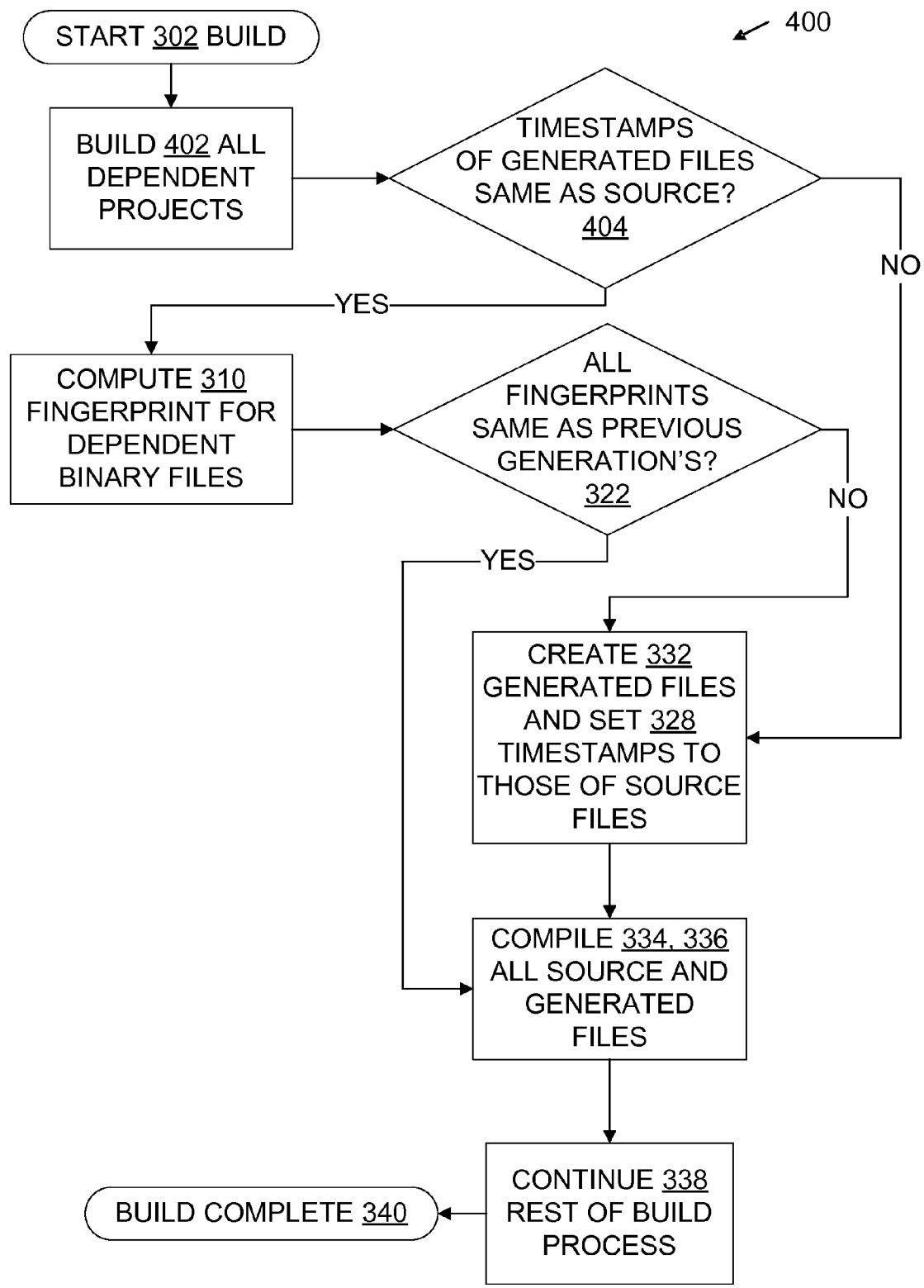
FIG. 4 is a flow chart illustrating steps of particular process and configured storage medium embodiments.

FIGS. 3 and 4 illustrate some process embodiments in flowcharts 300 and 400, respectively. Processes shown in the Figures may be performed in some embodiments automatically, e.g., as part of an application 120 build under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flows, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

Some embodiments proceed in response to a developer or script command to start 302 an application build attempt, within an IDE 140 or a command line interpreter, for example. Some embodiments regenerate 332 a code-behind file because its binary file's current fingerprint differs from its previous fingerprint. One embodiment computes 310 a current metadata-fingerprint 222 of a binary-file-set 128. The binary-file-set is derived (e.g., by compilation or interpretation) from a code-behind-file-set 126 of an application 120. The binary-file-set has a metadata-portion 202 and a non-metadata-portion 228. The metadata-portion includes the metadata 130 on which the metadata-fingerprint is based, and the non-metadata-portion includes the rest of the binary file-set (including metadata, if any, that is not used as a basis for the fingerprint). That is, the current metadata-fingerprint computation is based at least in part on the metadata-portion, and is independent of at least part of the non-metadata-portion. In response to ascertaining 322 that the current metadata-fingerprint differs from a previous metadata-fingerprint of the binary-file-set, this embodiment regenerates 332 the code-behind-file-set.

Some embodiments regenerate 332 a code-behind file 126, even though its current fingerprint 222 matches its previous fingerprint 222, because its actual metadata 130 has changed; two different metadata contents may sometimes yield the same fingerprint. After ascertaining 322 that the current metadata-fingerprint matches a previous metadata-fingerprint of the binary-file-set, one embodiment finds 324 that the current metadata-portion differs from a copy of the metadata-portion which was made when the previous metadata-fingerprint of the code-behind-file-set was computed 310. In response, the embodiment regenerates 332 the code-behind-file-set.

Some embodiments avoid 330 regenerating a code-behind file, because its current fingerprint 222 matches its previous fingerprint 222, and its actual metadata portion 202 has not changed. One embodiment ascertains 322 that the current metadata-fingerprint matches a previous metadata-fingerprint of the binary-file-set, and also finds 324 that the current metadata-portion matches a copy of the metadata-portion which was made when the previous metadata-fingerprint of the binary-file-set was computed. In response, the embodiment avoids 330 regenerating the code-behind-file-set.

An embodiment may compute 310 a metadata-fingerprint 222 in various ways. For instance, the fingerprint 222 may consist of, or may contain, a hash 316, a checksum 314, and/or a digital signature 318 that is based on the digital content of the metadata-portion 202. Fingerprints 222 may be based, e.g., on TypeDef, FieldDef, and MethodDef metadata tables 216. In some embodiments, computing 310 the current metadata-fingerprint involves reading 308 metadata which includes at least one type definition, at least one method definition, and at least one field definition, and these definitions are permitted to overlap one another. A metadata-fingerprint 222 may also be defined recursively in an embodiment, e.g., as a collection of constituent fingerprints. For example, a metadata-fingerprint 222 could be defined to include a TypeDef table hash and a checksum of all public method definitions.

In some embodiments, the metadata-fingerprint computation 310, 312 for at least one binary-file-set is based on class(es) and/or on property(ies) that are used when generating the code-behind-file-set corresponding to that binary-file-set, and is not based on any class/property that is not used when generating that code-behind-file-set. In some, the computation 310 is based at least in part on public method(s) of the code-behind-file-set corresponding to that binary-file-set, and is not based on at least one private method of that code-behind-file-set.

The metadata-portion is characterized in some embodiments as including, or variously as consisting of, type definition(s), method definition(s), field definition(s), class property definition(s) that are used when generating a code-behind-file-set that corresponds to the binary-file-set, class definition(s) that are used when generating a code-behind-file-set that corresponds to the binary-file-set, or public method definition(s) that are used when generating a code-behind-file-set that corresponds to the binary-file-set.

Some embodiments test multiple fingerprints for a given application. Some compute 310 respective current metadata-fingerprints 222 for multiple binary-file-sets of the application 120, and ascertain 322 whether each current metadata-fingerprint differs from a previous metadata-fingerprint for its respective binary-file-set.

Some embodiments avoid 306 fingerprinting system assemblies or other binary-file-sets 230 that a developer is unlikely (or even unable) to change. One embodiment identifies 304 a binary-file-set as a system binary-file-set, using a whitelist, blacklist, file signature, registry entry, or other mechanism, and then avoids 306 computing a current metadata-fingerprint 222 for that system binary-file-set or otherwise basing the regeneration determination on whether the system metadata changed—the embodiment assumes instead that system metadata has not changed. When new system metadata is released, all file-sets 126 are regenerated.

Some embodiments determine 320 whether to regenerate code-behind file(s) based on fingerprint(s) of selected metadata 130 as a result of the developer starting 302 a software application build—an attempt to build an application in a computing environment 100. The computing environment has random access memory 112 in communication with at least one processor 110. The embodiment proactively computes 310 respective metadata-fingerprints for dependent binary-file-sets of the application. Each dependent binary-file-set is derived from a code-behind-file-set of the application. Each binary-file-set has a respective metadata-portion and a respective distinct non-metadata-portion. Each metadata-fingerprint computation 310 is based at least in part on the respective metadata-portion and is independent of at least part of the respective non-metadata-portion. The embodiment computationally and proactively determines 320 whether to regenerate a code-behind-file-set based at least in part on whether the metadata-fingerprint for the binary-file-set derived from that code-behind-file-set has changed since a previous attempt to build the application.

Some embodiments check 326 whether a timestamp 226 of a code-behind-file-set matches a timestamp of a user-interface-file-set of the application. Some generate 332 a code-behind-file-set and set 328 a timestamp of that code-behind-file-set to match a timestamp of a user-interface-file-set of the application. Some embodiments check 326 whether a timestamp 226 of a binary-file-set has changed since the previous attempt to build the application, and avoid 306 recomputing 310 the fingerprint if the timestamp has not changed. The fingerprint may be stored as file metadata, may be embedded in the name of the file, or may be stored as file-system metadata of the file, e.g., as an alternate data stream.

With regard to FIG. 4 in particular, some embodiments start 302 an application build by building 402 all dependent projects of the application 120. These embodiments test 404 whether the timestamps 226 of the generated files 126 are the same as the developer-authored source code 122. If the test 404 result is yes, these embodiments compute 310 fingerprints 222 for dependent binary files 128, then ascertain whether all fingerprints 222 are the same as the previous generation's fingerprints 222. Flows proceed as illustrated in FIG. 4. Embodiments create 332 the generated files 126, and set 328 their timestamps 226 to match the developer-authored source code files. Developer-authored source and tool-generated source 126 is compiled 334, 336, respectively. The rest of the build process continues 338, e.g., with linking to resolve references. If all goes well, the build completes 340. Otherwise, debugging is performed.

Configured Media

With regard to all Figures, some embodiments include a configured 342 computer-readable storage medium 112. Medium 112 may include disks (magnetic, optical, or otherwise), RAM, EEPROMS or other ROMs, and/or other configurable memory, including in particular non-transitory computer-readable media (as opposed to wires and other propagated signal media). The storage medium which is configured 342 may be in particular a removable storage medium 114 such as a CD, DVD, or flash memory. A general-purpose memory, which may be removable or not, and may be volatile or not, can be configured 342 into an embodiment using items such as metadata-portions 202, metadata-fingerprints 222, metadata-fingerprint computation code 220, and regeneration determination code 224, in the form of data 118 and instructions 116, read from a removable medium 114 and/or another source such as a network connection, to form a configured medium. The configured medium 112 is capable of causing a computer system to perform process steps for transforming metadata 130 through regeneration determination as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

ADDITIONAL EXAMPLES

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

By way of context, when new applications are being created, it is not unusual that many new classes are created, the user interface is designed and developed, and a lot of building is performed. Toward the end of product development a stabilization phase is entered. During this stage, very little user interface changes, but many implementation details are changed; code is commented, bugs are fixed, refactoring takes place, error handling is added, and so on. Every time the user builds their application, the code behind the user interface files are regenerated as these files rely upon types in the framework or in the user's application.

But often the framework types do not change, because many frameworks are released in yearly cycles or at other intervals that are long relative to an individual application's development cycle. While application development starts to lock down, bugs may be fixed in the user interface classes themselves, but the declarative user interface files may not be changed as often. However under some familiar approaches, with every build the compiler generates the code behind.

By taking a fingerprint of the assemblies referenced in an application, a major optimization can be performed. If the fingerprint remains the same from one build to the next, and the user interface files haven't changed, then one can avoid regenerating the code behind files, and thus avoid recompiling them. Generated code may include code that does not get compiled regardless, but much of the automatically generated code does get compiled after being emitted.

Some embodiments use the native and/or other metadata APIs (application program interfaces) to walk a set of interesting metadata tables and use the data in the table as input to a hash or other fingerprint 222. During the build process the compiler is passed a list of reference assemblies. If the list of reference assemblies is different than the last compile, some embodiments regenerate the code behind files; this will provide the users with warnings if they have removed an assembly which was required by their user interface.

For each reference assembly, a fingerprint 222 is calculated. If this fingerprint 222 is different than the previous build, this is noted, and the code-behind files are re-generated. The entry for this assembly is updated with the new fingerprint 222. On the first build, there is no list of fingerprint 222, so all assemblies are fingerprinted. To improve performance, some embodiments do not fingerprint system assemblies. If the user interface files 124 have not changed since the last build (based on date/timestamp checks), and after fingerprinting the assemblies they are all the same as the previous run, then no further work is done. No files 126 are generated.

Notably, in some embodiments the fingerprint 222 is not simply a hash of the assembly. It is only over the relevant parts of the assembly, e.g., only public members, and only methods and type names. In a WinMD environment, for example, the metadata-portion 202 may include one or more of the following metadata tables: AssemblyRef, CustomAttribute, Event, EventMap, Field, GenericParam, GenericParamConstraint, InterfaceImpl, ManifestResource, MemberRef, MethodDef, MethodImpl, MethodSemantics, MethodSpec, Property, PropertyMap, StandAloneSig, TypeDef, TypeRef, TypeSpec.

Some embodiments use the native metadata APIs to walk the set of interesting tables and use the data in the table as input to the hash fingerprint 222. For tables that reference other data (e.g., anything in Blob heap or String Heap), the embodiment finds the referenced data and add them as input to the hash.

If an embodiment walks through all rows of the table, changes to private types/data results in the hash being changed. This is not an issue for pure WinMD files, but .NET based WinMD files have a higher chance of indicating a false positive (that the files have to be re-generated while they don't have to be). This can be mitigated using a familiar slower path of checking actual metadata content to do a second level of validation.

An API may return the same hash 222 although the metadata has changed. This could happen even if there have been significant changes to metadata between the current and previous version. One mitigation is a build failure so the user has to rebuild. A different approach is to dump the contents of the tables and blob/string to a file as binary, and do a binary diff between the dump of the previous version and the current version.

Some embodiments are implemented using the following list of interesting tables and string/blob data. First line is the table token identifier, any sub items provide information about the column that references heap data (Column name, data type, column number) that is relevant to the computation of the fingerprint. The column information specified for a table references data in the heap or elsewhere; that data is retrieved and included as part of the basis of the fingerprint computation.

```
        mdtTypeDef
            Name, String, 1
            NameSpace, String, 2
        mdtFieldDef
            Name, String, 1
            Signature, Blob, 2
        mdtMethodDef
            Name, String, 3
            Signature, Blob, 4
        mdtInterfaceImpl
        mdtMemberRef
            Name, String, 1
            Signature, Blob, 2
        mdtCustomAttribute
            Value, Blob, 2
        mdtEvent
            Name, String, 1
        mdtProperty
            Name, String, 1
            Type, Blob, 2
        mdtMethodImpl
        mdtTypeSpec
            Signature, Blob, 0
```

One aspect of some embodiments is a collection of processes for determining whether to regenerate a code-behind file based on fingerprints of selected metadata. One such process includes the following steps, which are not necessarily always performed in the order presented below.

First, particular metadata is designated to be fingerprinted. Only some—not all—of the metadata used in binary files are designated to be fingerprinted. For example, some processes designate at least TypeDef, FieldDef, and MethodDef metadata tables.

Second, a single initial fingerprint for each binary file is generated based on the designated metadata of that binary file. This can be done by dumping all the designated metadata into a blob and fingerprinting the blob, for example. Note that this is not a fingerprint of the entire binary file and in some cases not a fingerprint of the entire metadata of the binary file, but is instead based only on the content of the designated metadata, e.g., specific metadata tables.

Third, each time a request is made to build the application, a determination is made to decide which of the binary file(s) of the application will be regenerated (and perhaps also recompiled) to build the application. The determination is made as follows:

(i) If the UI file has changed (same date/timestamp as previous request to build the application), then regenerate all binary file source.

(ii) Otherwise, calculate the fingerprint of each binary file, based on that binary file's designated metadata, and compare it to the previously generated fingerprint of the binary file. If the fingerprint has changed, then regenerate that binary file. If the fingerprint has not changed, then compare the actual current binary content of the designated metadata to a copy of their binary content last time they were fingerprinted; if any table binary content has changed, then regenerate that binary file.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-readable storage medium configured with data and with instructions that when executed by at least one processor causes the processor(s) to perform a process for determining whether to regenerate code-behind file(s) based on fingerprint(s) of selected metadata, the process comprising the steps of:

computing a current metadata-fingerprint-A of a binary-file-set-A, the binary-file-set-A derived from a code-behind-file-set-A of an application, the binary-file-set-A having a metadata-portion-A and a non-metadata-portion-A, the current metadata-fingerprint-A computation based at least in part on the metadata-portion-A and independent of at least part of the non-metadata-portion-A;

checking whether a timestamp of a code-behind-file-set matches a timestamp of a user-interface-file-set of the application;

ascertaining that the current metadata-fingerprint-A differs from a previous metadata-fingerprint-A of the binary-file-set-A;

regenerating the code-behind-file-set-A in response to ascertaining that the current and previous metadata-fingerprints-A differ; and identifying a binary-file-set as a system binary-file-set which has been derived by compilation or interpretation, as opposed to being a non-binary file, and then avoiding computing a current metadata-fingerprint for that system binary-file-set.

2. The configured medium of claim 1, wherein the process further comprises:

computing a current metadata-fingerprint-B of a binary-file-set-B, the binary-file-set-B derived from a code-behind-file-set-B of the application, the binary-file-set-B having a current metadata-portion-B and a distinct non-metadata-portion-B, the current metadata-fingerprint-B computation based at least in part on the current metadata-portion-B and independent of at least part of the non-metadata-portion-B;

ascertaining that the current metadata-fingerprint-B matches a previous metadata-fingerprint-B of the binary-file-set-B;

finding that the current metadata-portion-B differs from a copy of the metadata-portion-B which was made when the previous metadata-fingerprint-B of the code-behind-file-set-B was computed; and regenerating the code-behind-file-set-B in response to finding that the current metadata-portion-B differs from the copy.

3. The configured medium of claim 1, wherein the process further comprises:

computing a current metadata-fingerprint-B of a binary-file-set-B, the binary-file-set-B derived from a code-behind-file-set-B of the application, the binary-file-set-B having a current metadata-portion-B and a non-metadata-portion-B, the current metadata-fingerprint-B computation based at least in part on the current metadata-portion-B and independent of at least part of the non-metadata-portion-B;

ascertaining that the current metadata-fingerprint-B matches a previous metadata-fingerprint-B of the binary-file-set-B;

finding that the current metadata-portion-B matches a copy of the metadata-portion-B which was made when the previous metadata-fingerprint-B of the binary-file-set-B was computed; and avoiding regenerating the code-behind-file-set-B in response to finding that the current metadata-portion-B matches the copy.

4. The configured medium of claim 1, wherein computing the current metadata-fingerprint-A of the binary-file-set-A comprises computing at least one of the following: a hash, a checksum, a digital signature, a set of constituent fingerprints.

5. The configured medium of claim 1, wherein the process comprises computing respective current metadata-fingerprints for multiple binary-files-sets of the application, and ascertaining whether each current metadata-fingerprint differs from a previous metadata-fingerprint for its respective binary-file-set.

6. The configured medium of claim 1, wherein computing the current metadata-fingerprint-A comprises reading metadata which includes at least one type definition, at least one method definition, and at least one field definition, and wherein these definitions are permitted to overlap one another.

7. The configured medium of claim 1, wherein the application comprises at least one of the following: XAML code, C++ code, C# code, BASIC code, markup language code.

8. The configured medium of claim 1, wherein the application comprises at least one of the following: web-based application code, code for rendering a user interface.

9. The configured medium of claim 1, wherein computing the current metadata-fingerprint-A comprises reading metadata which includes at least one of the following: a type definition, a method definition, a field definition.

10. The configured medium of claim 1, wherein computation of the current metadata-fingerprint-A is based at least in part on public method(s) of code-behind-file-set-A, and is not based on at least one private method of code-behind-file-set-A.

11. A computational process for determining whether to regenerate code-behind file(s) based on fingerprint(s) of selected metadata, the process comprising the computational steps of:

starting a software application build which is an attempt to build an application in a computing environment having random access memory in communication with at least one processor;

identifying a binary-file-set as a system binary-file-set which has been derived by compilation or interpretation, as opposed to being a non-binary file, and then avoiding computing a current metadata-fingerprint for that system binary-file-set;

proactively computing respective metadata-fingerprints for dependent binary-file-sets of the application, each binary-file-set having a respective metadata-portion and a respective distinct non-metadata-portion, each metadata-fingerprint computation based at least in part on the respective metadata-portion and independent of at least part of the respective non-metadata-portion, wherein the metadata-fingerprint computation for at least one binary-file-set is not based on any system binary-file-set current metadata-fingerprint; and computationally and proactively determining whether to regenerate a code-behind-file-set based at least in part on whether the metadata-fingerprint for the binary-file-set has changed since a previous attempt to build the application, wherein the determining step comprises checking whether a timestamp of a code-behind-file-set matches a timestamp of a user-interface-file-set of the application.

12. The computational process of claim 11, wherein computing the metadata-fingerprints comprises reading metadata which includes at least one of the following: a type definition, a method definition, a field definition.

13. The computational process of claim 11, wherein the metadata-fingerprint computation for at least one binary-file-set is based on class(es) that are used when generating the code-behind-file-set corresponding to that binary-file-set, and is not based on any class that is not used when generating that code-behind-file-set.

14. The computational process of claim 11, wherein the metadata-fingerprint computation for at least one binary-file-set is based on class property(ies) that are used when generating the code-behind-file-set corresponding to that binary-file-set, and is not based on any class property that is not used when generating that code-behind-file-set.

15. The computational process of claim 11, wherein the determining step further comprises at least one of the following:
generating a code-behind-file-set and setting a timestamp of that code-behind-file-set to match a timestamp of a user-interface-file-set of the application;
avoiding recomputing a metadata-fingerprint for a binary-file-set after checking determines that a timestamp of the binary-file-set has not changed since the previous attempt to build the application.

16. A computer system comprising:
a logical processor;
a memory in operable communication with the logical processor;
a binary-file-set residing in the memory and having a metadata-portion and a non-metadata-portion, the binary-file-set having been identified as a system binary-file-set and derived by compilation or interpretation, as opposed to being a non-binary file; and then avoiding computing a current metadata-fingerprint for that system binary-file-set;
metadata-fingerprint computation code residing in the memory which upon execution by the processor computes a metadata-fingerprint that is computationally based at least in part on the metadata-portion, is computationally independent of the non-metadata-portion, is not based on any system binary-file-set current metadata-fingerprint, and includes at least one of the following structures: a hash, a checksum, a digital signature;
code residing in the memory which upon execution by the processor checks whether a timestamp of a code-behind-file-set matches a timestamp of a user-interface-file-set of the application;
code residing in the memory which upon execution by the processor compares a previously generated binary-file-set metadata-fingerprint with a current version and determines whether the metadata-fingerprint has changed; and
code residing in the memory which upon execution by the processor avoids regenerating the code-behind-file-set in response to finding that the metadata-fingerprint has not changed.

17. The system of claim 16, wherein the metadata-portion is characterized in at least one of the following ways:
the metadata-portion comprises a type definition;
the metadata-portion consists of type definition(s);
the metadata-portion comprises a method definition;
the metadata-portion consists of method definition(s);
the metadata-portion comprises a field definition;
the metadata-portion consists of field definition(s);
the metadata-portion comprises class property(ies) definition(s) that are used when generating a code-behind-file-set that corresponds to the binary-file-set;
the metadata-portion consists of class property(ies) definition(s) that are used when generating a code-behind-file-set that corresponds to the binary-file-set;
the metadata-portion comprises class(es) definition(s) that are used when generating a code-behind-file-set that corresponds to the binary-file-set;
the metadata-portion consists of class(es) definition(s) that are used when generating a code-behind-file-set that corresponds to the binary-file-set;
the metadata-portion comprises public method definition(s) that are used when generating a code-behind-file-set that corresponds to the binary-file-set;
the metadata-portion consists of public method definition(s) that are used when generating a code-behind-file-set that corresponds to the binary-file-set.

18. The system of claim 16, further comprising at least one of the following residing in the memory: XAML code, C++ code, C# code, BASIC code, markup language code, web-based application code, code for rendering a user interface.

19. The system of claim 16, further comprising regeneration determination code residing in the memory which upon execution by the processor computationally determines whether to regenerate a code-behind-file-set based at least in part on whether the metadata-fingerprint for the binary-file-set derived from that code-behind-file-set has changed since a previous application build attempt.

20. The system of claim 16, further comprising regeneration determination code residing in the memory which upon execution by the processor computationally determines whether to regenerate a code-behind-file-set as follows: if a UI file-set corresponding to the code-behind-file-set has changed then regenerate the code-behind-file-set, and otherwise, compute the metadata-fingerprint of the binary-file-set, compare it to a previously generated metadata-fingerprint of the binary-file-set, and if the metadata-fingerprint has changed, then regenerate the binary-file-set, and otherwise compare the metadata-portion to a copy of the metadata-portion made last time the binary-file-set was metadata-fingerprinted, and if the metadata-portion has changed, then regenerate the binary-file-set.

* * * * *